US012806562B2

(12) United States Patent
Yavuz Kaya et al.

(10) Patent No.: US 12,806,562 B2
(45) Date of Patent: Nov. 24, 2026

(54) AIR PURIFIER COMPRISING A MICROBUBBLE GENERATOR

(71) Applicant: ARCELIK ANONIM SIRKETI, Istanbul (TR)

(72) Inventors: Pinar Yavuz Kaya, Istanbul (TR); Emre Yavuz Türk, Istanbul (TR); Koray Erdogăn, Istanbul (TR); Ünsal Kaya, Istanbul (TR); Şahin Sivaslioğlu, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 679 days.

(21) Appl. No.: 17/928,112

(22) PCT Filed: Jul. 8, 2021

(86) PCT No.: PCT/TR2021/050698
§ 371 (c)(1),
(2) Date: Nov. 28, 2022

(87) PCT Pub. No.: WO2022/060323
PCT Pub. Date: Mar. 24, 2022

(65) Prior Publication Data

US 2023/0219032 A1 Jul. 13, 2023

(30) Foreign Application Priority Data

Sep. 16, 2020 (TR) ................................ 2020/14690

(51) Int. Cl.
*B01D 53/18* (2006.01)
*B01D 53/14* (2006.01)
(Continued)

(52) U.S. Cl.
CPC ......... *B01D 53/18* (2013.01); *B01D 53/1475* (2013.01); *B01D 53/62* (2013.01);
(Continued)

(58) Field of Classification Search
CPC . A61L 9/00–22; A61L 2/00–28; B01D 53/18; B01D 53/1475; B01D 53/62;
(Continued)

(56) References Cited

U.S. PATENT DOCUMENTS

2015/0251129 A1* 9/2015 Heirman ................ B01D 53/80 95/190

FOREIGN PATENT DOCUMENTS

CN 104359175 A 2/2015
KR 100377020 B1 3/2003
(Continued)

OTHER PUBLICATIONS

Translation—WO 2019037470 A1 (Year: 2019).*
(Continued)

*Primary Examiner* — Kevin Joyner
(74) *Attorney, Agent, or Firm* — Kilpatrick Townsend & Stockton LLP

(57) ABSTRACT

The present invention relates to an air purifier comprising a body having an air inlet through which the air in the environment is sucked and a clean air outlet through which the cleaned air is released, and a $CO_2$ adsorption unit which is provided on the body, which chemically adsorbs the carbon dioxide in the air taken into the body by being supplied with air together with a basic solution.

20 Claims, 5 Drawing Sheets

Figure 1:
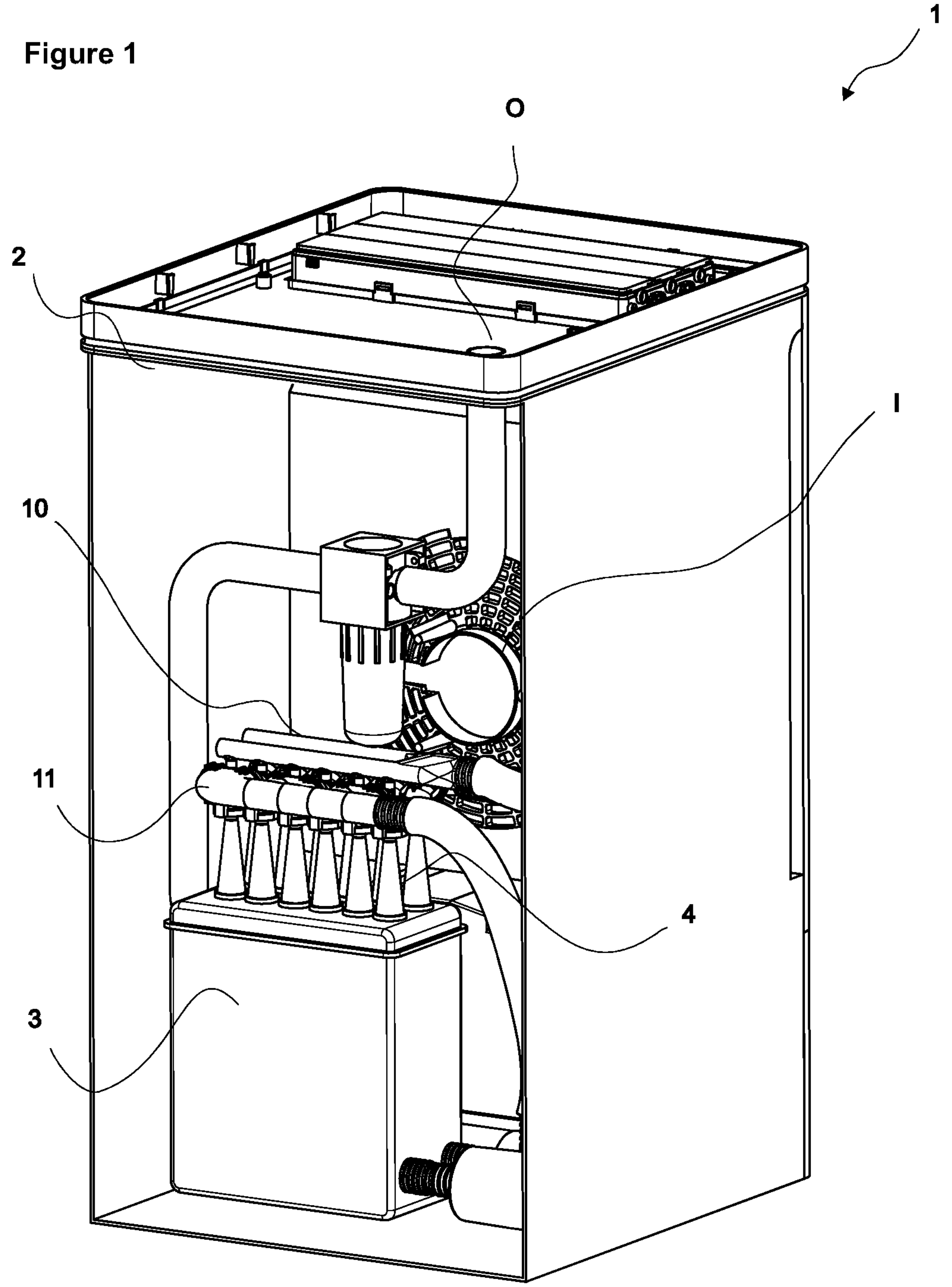

(51) Int. Cl.
*B01D 53/62* (2006.01)
*B01D 53/78* (2006.01)
*B01F 23/232* (2022.01)
*B01F 25/312* (2022.01)

(52) U.S. Cl.
CPC ............ *B01D 53/78* (2013.01); *B01F 23/232* (2022.01); *B01F 25/312* (2022.01); *B01D 2257/504* (2013.01); *B01D 2258/06* (2013.01); *B01D 2259/4508* (2013.01)

(58) Field of Classification Search
CPC .............. B01D 53/78; B01D 2257/504; B01D 2258/06; B01D 2259/4508; B01F 23/232; B01F 25/312
See application file for complete search history.

(56) References Cited

FOREIGN PATENT DOCUMENTS

| | | | | |
|---|---|---|---|---|
| KR | 102063071 B1 * | 1/2020 | ........... | B01D 47/021 |
| WO | 2011104633 A2 | 9/2011 | | |
| WO | WO-2019037470 A1 * | 2/2019 | ............. | B01F 23/23 |

OTHER PUBLICATIONS

Translate—KR 102063071 b1 (Year: 2020).*
PCT/TR2021/050698 , "International Search Report and Written Opinion", Nov. 16, 2021, 8 pages.

* cited by examiner

AIR PURIFIER COMPRISING A MICROBUBBLE GENERATOR

RELATED APPLICATIONS

This application is a U.S. National Phase of International Application No. PCT/TR2021/050698, filed Jul. 8, 2021, claiming priority to Turkish Patent Application No. 2020/14690, filed Sep. 16, 2020, contents of which are hereby incorporated by reference in their entirety.

The present invention relates a device which cleans the air and which comprises a microbubble generator.

Today, the need for ventilation and the need for fresh air becomes more important in environments such as homes and offices especially in high-rise buildings. Plants can be a temporary solution for daytime but when the sunlight disappears, plants also start to produce carbon dioxide like human beings and the air quality of the environment decreases. Especially in high-rise buildings, it is not always possible to continuously keep the windows open and ventilate the environment. The continuously rising carbon dioxide amount in the air adversely affects human health. The amount of oxygen in a closed environment directly affects the metabolic rate of people and the lack thereof creates weakness and fatigue in humans. Ensuring that the amount of oxygen in the closed environment does not fall below a certain level while reducing the amount of carbon dioxide generated in the environment makes the human metabolism much more vivid and vigorous.

In the state of the art Korean Patent Document No. KR100377020B1, a microbubble generator is disclosed, which is used in water treatment systems. However, it is not stated in the document that said microbubble generator is related to an air purifier.

The aim of the present invention is the realization of an air purifier with increased carbon dioxide adsorption capacity.

The air purifier of the present invention comprises an air inlet and a clean air outlet which are provided on the body. The air purifier further comprises a base supply unit and an acid supply unit. In the air purifier, the air taken through the air inlet by means of a fan is delivered to the $CO_2$ adsorption unit together with the basic liquid solution by means of a pump via microbubble generator.

In the $CO_2$ adsorption unit, a carbonation reaction occurs between the basic liquid solution and the carbon dioxide (air) passing through the solution. In order to increase the efficiency of the reaction, the air passed through the liquid solution must have a high number of small bubbles. For a carbon dioxide adsorption process at maximum efficiency, it is required that the basic solution and air contact each other for as long as possible, and the bubbles formed by this contact are small. Therefore, it is possible to increase the reaction surface area in the $CO_2$ adsorption unit by decreasing the diameter of the air bubbles pumped into the basic liquid solution while increasing the number thereof. By means of the microbubble generator provided in the air purifier of the present invention, a high number of bubbles at micro scale are generated such that the basis liquid solution and the carbon dioxide contact each other for a longer time and the reaction speed is increased.

By means of the present invention, an air purifier is realized, wherein a higher amount of carbon dioxide is adsorbed to clean the closed environment air by increasing the contact surface area between the carbon dioxide in the closed environment air and the basic liquid solution and thus increasing the efficiency of the reaction.

The model embodiments that relate to the air purifier realized in order to attain the aim of the present invention are illustrated in the attached figures, where:

FIG. 1—is the perspective view of the air purifier in an embodiment of the present invention.

Figure 2:
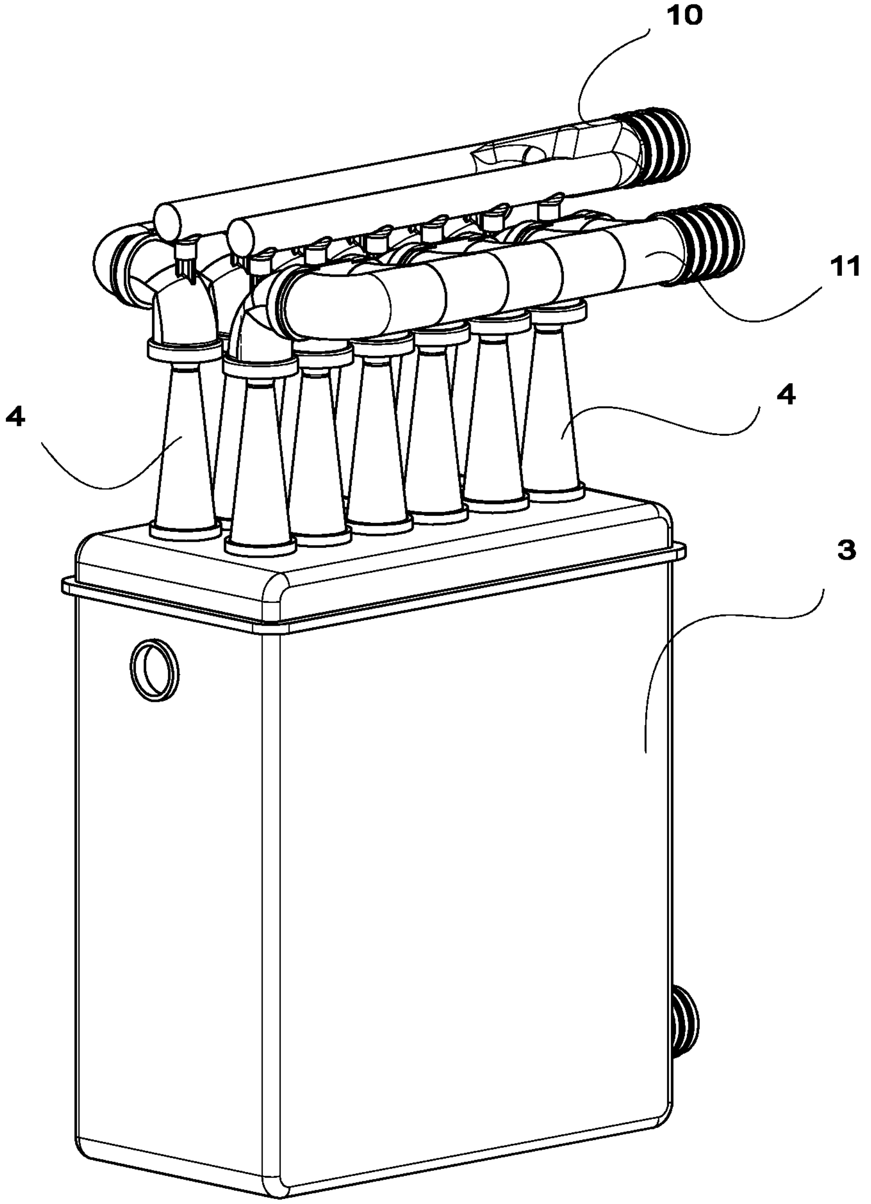

FIG. 2—is the perspective view of the $CO_2$ adsorption unit and the plurality of microbubble generators in the air purifier in an embodiment of the present invention.

Figure 3:
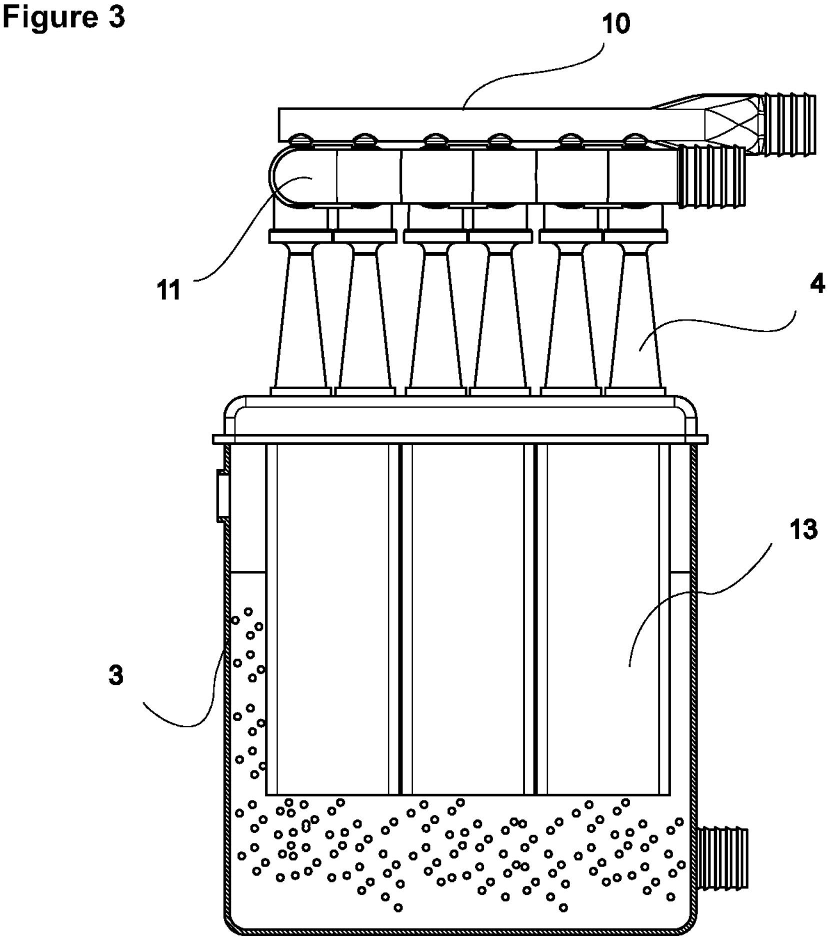

FIG. 3—is the view of the $CO_2$ adsorption unit and the flow separators in the air purifier in an embodiment of the present invention.

Figure 4:
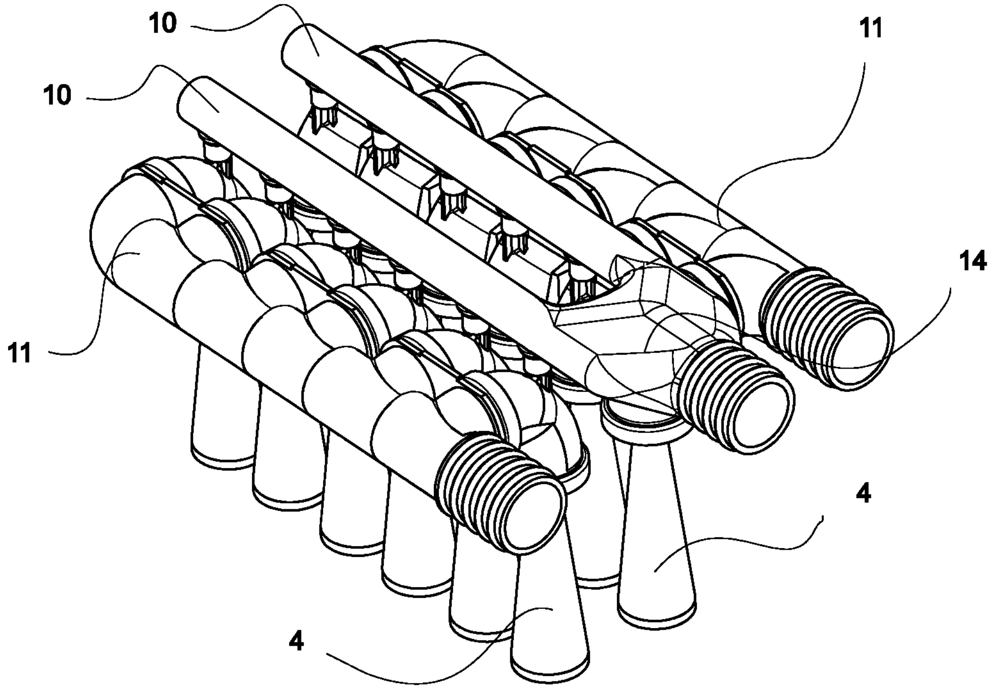

FIG. 4—is the perspective view of the plurality of microbubble generators, the air delivery and liquid delivery pipes in the air purifier in an embodiment of the present invention.

Figure 5:
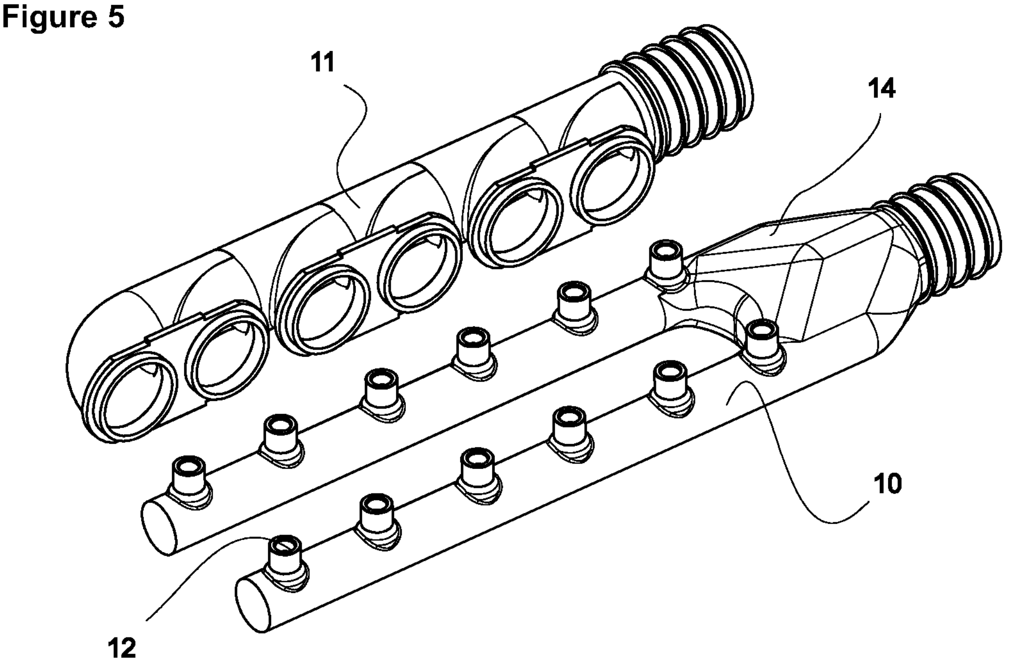

FIG. 5—is the detailed view of the air and liquid delivery pipes in the air purifier in an embodiment of the present invention.

Figure 6:
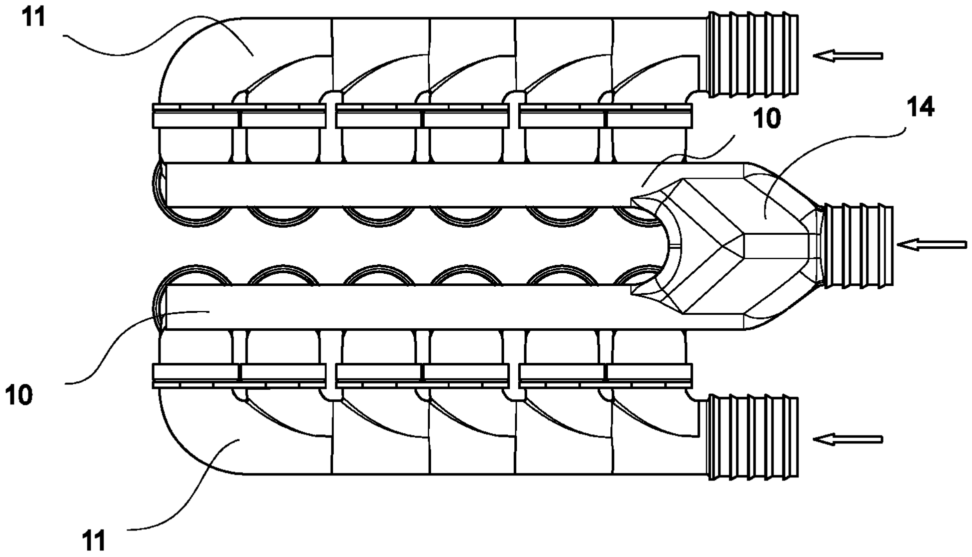

FIG. 6—is the top view of the flow in the air and liquid delivery pipes in the air purifier in an embodiment of the present invention.

Figure 7:
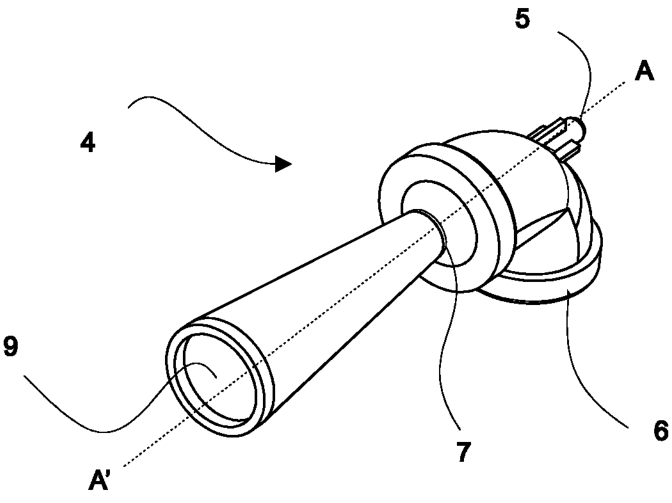

FIG. 7—is the perspective view of the microbubble generator in the air purifier in an embodiment of the present invention.

Figure 8:
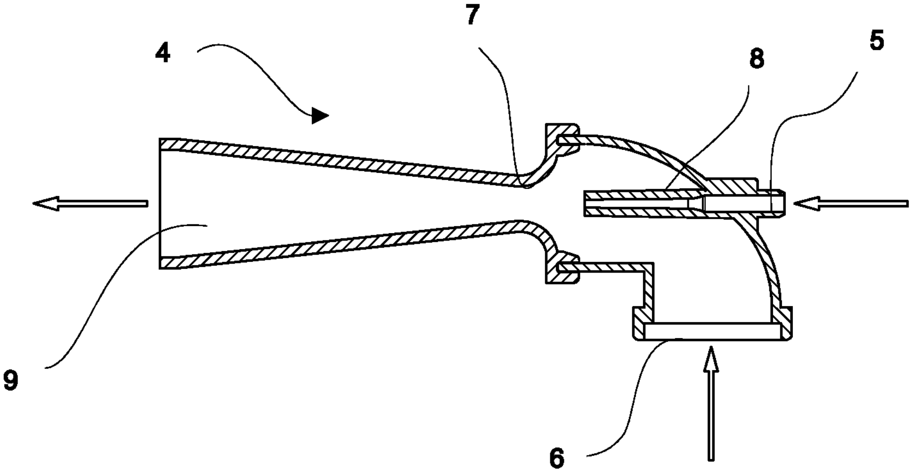

FIG. 8—is the front view of the cross section A-A of the microbubble generator in FIG. 7.

Figure 9:
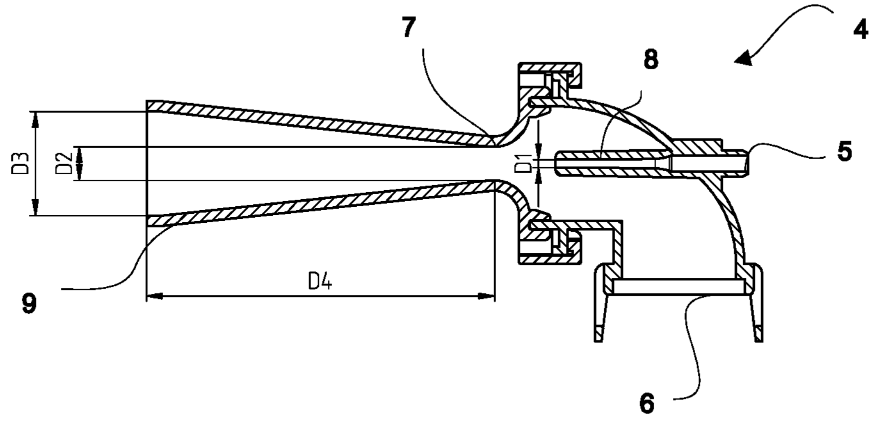

FIG. 9—is the view showing the widths and lengths in the microbubble generator in the cross section in FIG. 8.

The elements illustrated in the figures are numbered as follows:

1. Air purifier
2. Body
3. $CO_2$ adsorption unit
4. Microbubble generator
5. Air inlet port
6. Liquid inlet port
7. Duct
8. Channel
9. Outlet tube
10. Air delivery tube
11. Liquid delivery tube
12. Nozzle
13. Flow separator
14. Connection member
I: Air inlet
O: Clean air outlet
D1: Channel width
D2: Duct width
D3: Outlet tube width
D4: Outlet tube length The air purifier (1) comprises a body (2) having an air inlet (I) through which the air in the environment is sucked and a clean air outlet (O) through which the cleaned air is released, and a $CO_2$ adsorption unit (3) which is provided on the body (2), which chemically adsorbs the carbon dioxide in the air taken into the body (2) by being supplied with air together with a basic solution.

The air purifier (1) of the present invention comprises at least one microbubble generator (4) having

- an air inlet port (5) which provides the delivery of the air sucked into the body (2) to the $CO_2$ adsorption unit (3),
- a liquid inlet port (6) which provides the delivery of the basic liquid solution to the $CO_2$ adsorption unit (3),
- a duct (7) where the air and the basic liquid solution are mixed, a channel (8) which delivers the air from the air inlet port (5) to the duct (7) such that the basic liquid solution and the air are mixed, and an outlet tube (9) through which the air-basic liquid solution mixture is taken into the $CO_2$ adsorption unit (3).

The air purifier (1) of the present invention comprises at least one microbubble generator (4) which enables the basic liquid solution and the air the in the environment to be mixed so as to be delivered to the $CO_2$ adsorption unit (3). By means of an air inlet port (5) and a liquid inlet port (6) provided on the microbubble generator (4), the air and the basic solution enter the microbubble generator (4) through separate lines. The channel (8) which delivers the air is arranged at the air inlet port (5). The microbubble generator (4) further comprises a duct (7). Said duct (7) has a width narrower than the width of the liquid inlet port (6), and the air flowing through the channel (8) and the basic solution taken through the liquid inlet port (6) meet first time at the duct (7) and get mixed. Thus, microbubbles are formed in the liquid-air mixture due to pressure, and the resulting mixture is transferred to the $CO_2$ adsorption unit (3) through the outlet tube (9). The microbubbles forming in the mixture increase the efficiency of the reaction occurring between the basic solution and the carbon dioxide in the air, thus ensuring that a higher amount of carbon dioxide is converted to carbonate so as to clean the air.

In an embodiment of the present invention, in the microbubble generator (4), the width (D2) of the duct (7) is three to five times the width (D1) of the channel (8). Thus, the microbubbles generated in the microbubble generator (4) have the optimum dimensions for improved reaction efficiency.

In an embodiment of the present invention, in the microbubble generator (4), the width (D3) of the outlet tube (9) is 10 to 15 times the width (D1) of the channel (8). Thus, the microbubbles generated in the microbubble generator (4) have the optimum dimensions for improved reaction efficiency.

In an embodiment of the present invention, in the microbubble generator (4), the length (D4) of the outlet tube (9) is 40 to 50 times the width (D1) of the channel (8). Thus, the basic solution-air mixture formed in the microbubble generator (+) can be efficiently delivered to the $CO_2$ adsorption unit (3) by maintaining the bubbles.

In an embodiment of the present invention, the air purifier (1) comprises at least one air delivery tube (10) having at least one nozzle (12) which can be connected to the air inlet port (5) at the microbubble generator (4). Thus, the air sucked into the body (2) is transferred to the microbubble generator (4).

In an embodiment of the present invention, the air purifier (1) comprises a connection member (14) which connects at least two air delivery tubes (10). Thus, a plurality of microbubble generators (4) can be connected to a plurality of air delivery tubes (10) respectively. Moreover, the volume of air cleaned in unit time in the air purifier (1) is increased.

In an embodiment of the present invention, the air purifier (1) comprises at least one liquid delivery tube (11) which can be connected to the liquid inlet port (6) at the microbubble generator (4). By means of the liquid delivery tube (11), a plurality of microbubble generators (4) can be connected side by side in series.

In an embodiment of the present invention, the air purifier (1) comprises at least one flow separator (13) which regulates the flow of the air-basic liquid solution mixture in the $CO_2$ adsorption unit (3). Thus, the liquid-air mixture with bubbles coming from the microbubble generator (4) is prevented from further mixing in the $CO_2$ adsorption unit (3) such that the size of bubbles is prevented from increasing.

By means of the present invention, an air purifier (1) is realized, with increased carbon dioxide adsorption capacity and rate.

The invention claimed is:

1. An air purifier comprising:

a body having an air inlet through which air in an environment is sucked and a clean air outlet through which cleaned air is released;

a $CO_2$ adsorption unit which is provided on the body, which chemically adsorbs carbon dioxide in the air taken into the body by being supplied with air together with a basic liquid solution; and at least one microbubble generator comprising:

an inlet body, an air inlet port coupled with the inlet body, and which provides delivery of the air sucked into the body to the $CO_2$ adsorption unit, a liquid inlet port coupled with the inlet body, and which provides the delivery of the basic liquid solution to the $CO_2$ adsorption unit, a duct where the air and the basic liquid solution are mixed, a channel positioned within the inlet body, and which delivers the air from the air inlet port to the duct such that the basic liquid solution and the air are mixed in the duct, and an outlet tube through which the air-basic liquid solution mixture is taken into the $CO_2$ adsorption unit.

2. An air purifier as in claim 1, wherein the width of the duct is three to five times the width of the channel.

3. An air purifier as in claim 2, wherein the width of the outlet tube is 10 to 15 times the width of the channel.

4. An air purifier as in claim 2, wherein the length of the outlet tube is 40 to 50 times the width of the channel.

5. An air purifier as in claim 2, further comprising at least one air delivery tube having at least one nozzle which can be connected to the air inlet port at the microbubble generator.

6. An air purifier as in claim 2, further comprising at least one liquid delivery tube which can be connected to the liquid inlet port at the microbubble generator.

7. An air purifier as in claim 2, further comprising at least one flow separator which regulates flow of the air-basic liquid solution mixture in the $CO_2$ adsorption unit.

8. An air purifier as in claim 1, wherein the width of the outlet tube is 10 to 15 times the width of the channel.

9. An air purifier as in claim 8, wherein the length of the outlet tube is 40 to 50 times the width of the channel.

10. An air purifier as in claim 8, further comprising at least one air delivery tube having at least one nozzle which can be connected to the air inlet port at the microbubble generator.

11. An air purifier as in claim 8, further comprising at least one liquid delivery tube which can be connected to the liquid inlet port at the microbubble generator.

12. An air purifier as in claim 1, wherein the length of the outlet tube is 40 to 50 times the width of the channel.

13. An air purifier as in claim 12, further comprising at least one air delivery tube having at least one nozzle which can be connected to the air inlet port at the microbubble generator.

14. An air purifier as in claim 12, further comprising at least one liquid delivery tube which can be connected to the liquid inlet port at the microbubble generator.

15. An air purifier as in claim 1, by further comprising at least one air delivery tube having at least one nozzle which can be connected to the air inlet port at the microbubble generator.

16. An air purifier as in claim 15, further comprising by a connection member which connects at least two air delivery tubes.

17. An air purifier as in claim 16, further comprising at least one liquid delivery tube which can be connected to the liquid inlet port at the microbubble generator.

18. An air purifier as in claim 15, further comprising at least one liquid delivery tube which can be connected to the liquid inlet port at the microbubble generator.

19. An air purifier as in claim 1, further comprising at least one liquid delivery tube which can be connected to the liquid inlet port at the microbubble generator.

20. An air purifier as in claim 1, further comprising at least one flow separator which regulates flow of the air-basic liquid solution mixture in the $CO_2$ adsorption unit.

* * * * *